United States Patent [19]

Willcox

[11] 3,907,581

[45] Sept. 23, 1975

[54] OPALESCENT TiO$_2$-CONTAINING COMPOSITIONS

[75] Inventor: Oswin Burr Willcox, Landenberg, Pa.

[73] Assignee: E. I. Du Pont de Nemours and Company, Wilmington, Del.

[22] Filed: Dec. 5, 1972

[21] Appl. No.: 312,258

Related U.S. Application Data

[63] Continuation-in-part of Ser. No. 237,547, March 23, 1972, abandoned.

[52] U.S. Cl. ......... 106/193 J; 106/193 D; 106/300; 260/37 R; 260/37 N; 260/37 P; 260/37 PC; 260/40 R; 260/42.43; 260/42.49; 260/42.53

[51] Int. Cl.$^2$. C08K 3/22; C08L 1/18; C08L 25/06; C08L 77/00

[58] Field of Search ............ 260/41 B, 42.43, 42.54, 260/37 PC, 37 P, 42.49, 42.53; 106/300, 106/193 J, 37 N, 193 D

[56] References Cited

UNITED STATES PATENTS

| | | | |
|---|---|---|---|
| 3,008,844 | 11/1961 | Grunin | 106/193 J |
| 3,065,093 | 11/1962 | Bernstein | 106/253 |
| 3,069,281 | 12/1962 | Wilson | 106/300 |
| 3,251,704 | 5/1966 | Nellessen | 106/193 |
| 3,676,362 | 7/1972 | Yates | 260/42.54 |

FOREIGN PATENTS OR APPLICATIONS 4,115,252   1966   Japan

Primary Examiner—Allan Lieberman

[57] ABSTRACT

Solid polymeric compositions are prepared which are useful for fabricating decorative objects and forms having the appearance of pure, natural opal. These are formed of a substantially clear, colorless organic polymeric solid matrix and $10^{-4}$ to 10 volume percent of titanium dioxide substantially homogeneously dispersed therein, said titanium dioxide consisting of particles predominantly of the rutile crystal structure having a mean equivalent volume diameter by number of between 0.05 and 0.10 micron and being essentially free of particles having a dimension above 0.15 micron.

5 Claims, No Drawings

OPALESCENT TiO₂-CONTAINING COMPOSITIONS

CROSS REFERENCE TO RELATED APPLICATION

This application is a continuation-in-part of my U.S. Patent application Ser. No. 237,547, filed Mar. 23, 1972, now abandoned.

BACKGROUND OF THE INVENTION

In its purest form, mineral opal ranges from opaque milky white to transparent. The esthetically most pleasing form of pure opal is translucent, and is characterized by a bluish milky appearance when viewed by reflected light and yellow to orange by transmitted light. This appearance, commonly referred to as opalescence, results from the scattering of closely packed spheres of amorphous silica in which the surrounding media are of lower refractive index and comprised variably of air voids and water. The size of the silica spheres and the refractive index differences between the spheres and surroundings are such that blue light is more effectively back-scattered than the longer wavelengths. In precious opal the spheres are of uniform size and regularly packed so that light is diffracted and at certain angles of viewing brilliant colors can be seen.

The use of mineral opals for decorative objects has been limited by the small sizes of naturally occurring stones and the wide variability in translucency and color, the latter caused by admixtures of various impurities. Some success has been attained in approximating the appearance of mineral opal in the manufacture of certain opal glasses by precipitating appropriately sized particles of a high refractive index component — i.e., $TiO_2$ — within the glass matrix. However, the difficulty of controlling the particle growth in large objects has limited this application to jewelry, small vases, and such like.

Opalescent effects have been widely observed in colloidal suspensions of liquid particles in liquids (emulsions), and solid particles in liquids (sols), but because of the liquid matrix, these are of little practical utility. Certain polymeric compositions also exhibit an opalescent appearance due either to inclusion of crystalline domains within an amorphous matrix; or alternatively, in copolymers wherein concentration variations give domains of differing refractive indices. These effects are inherent in particular compositions and methods of polymerization and attempts to control or modify the visual effects result in undesirable alteration in other physical properties of the polymers.

It is an object of this invention to produce solid polymeric compositions which can be formed into objects and shapes having the appearance and esthetic appeal of pure natural opal, without limitations as to size and cost of presently known materials and methods.

It is a further object of this invention to produce new solid polymeric compositions which can be formed into objects and shapes of a translucent character that possess esthetically attractive appearances by virtue of their novel light reflection and transmission characteristics.

SUMMARY OF THE INVENTION

Decorative objects and forms having the visual appearance of pure, mineral opal are fabricated from polymeric compositions consisting of a clear, polymeric solid matrix free of light scattering material and rutile titanium dioxide having a means equivalent volume diameter of between 0.05 and 0.10 micron and being essentially free of particles having a dimension above 0.15 micron. The proportion of titanium dioxide is dependent on the dimensions and geometry of the fabricated object and the degree of translucency desired.

Novel decorative effects are produced in fabricated objects and forms by inclusion of dyes or pigments, preferably transparent (i.e., non-light scattering) pigments, such as the phthalocyanine or quinacridones, into the polymer-titanium dioxide mixture.

DETAILS OF THE INVENTION

Until now, fabrication of objects having an opalescent appearance from dilute dispersions of high refractive index white pigments — i.e. $TiO_2$ — in polymers has been unsuccessful. Although it is well known that preferential scattering of blue light by white pigments increases with decreasing particle size the commercially available pigments with the smallest particle sizes (0.15 micron) do not confer the desired clear, milky-blue reflectance characteristic of pure mineral opal. Dilute polymeric dispersion of a commercial, non-pigmentary anatase titanium dioxide of colloidal size (0.03 micron) likewise fails to give the desired opalescent appearance. Such anatase material tends, in any event, to be chemically reactive, easily discolored by light, inefficient in scattering due to very small size and difficult to disperse.

It has now been discovered that objects and forms having the visual appearance of pure, translucent opal can be fabricated from polymeric compositions containing a clear polymeric solid or a solution of such solid in an appropriate solvent, and a quantity of titanium dioxide of predominantly the rutile crystal modification having a mean single-crystal particle diameter by number of between 0.05 and 0.10 micron in diameter, and more preferably between 0.065 and 0.09 micron in diameter, the proportion of rutile titanium dioxide to solid polymer depending on the particular end use desired.

In expressing the $TiO_2$ particle diameters as mean diameters by number it is meant that these represent the mean of a size distribution 95% of whose particles are within ± 0.05 micron of the mean diameter and 67% of whose particles are within ± 0.025 micron of the mean diameter. Size distributions by weight are difficult to determine accurately from electron micrographs because of the usual irregular shape of the particles but the mean diameter by weight will be somewhat higher (~10%) because the size distribution curves of titanium dioxide pigments are always skewed towards the larger particles. However, standard deviation about the mean will be about the same for the weight distribution curves as for the number distribution curves. The mean diameters referred to herein are, because of their irregular shape, expressed in mean equivalent volume diameters, and these may be determined by usual electron microscopic techniques.

Of particular importance is the necessity of essentially excluding particles having a dimension above 0.15 micron, either of $TiO_2$ or other materials. Such large particles will not selectively scatter light in the desired manner but instead will degrade the cleanness and brightness of the blue reflectance of opalescent objects prepared therefrom. It is considered that even amounts as little as 5 percent by weight of particles of titanium dioxide greater than 0.15 micron in one or more dimensions based on total pigment added is noticeably degrading to the opalescence.

The preferred rutile may be obtained by any suitable process such as the wet sulfate or hydrothermal methods although the product obtained by the oxidation of titanium tetrachloride and containing 0.1 to 3.0% co-oxidized aluminum oxide is preferred because of the greater economy and flexibility of the process.

For many applications such as interior decorative objects or disposable items, the untreated rutile is satisfactory. Where durability and resistance to yellowing under outdoor exposure to sunlight and moisture is required, it is desirable to reduce the photocatalytic activity of the rutile by treating the particles with a hydrous metal oxide such as silica or alumina. If desired, the particle can be treated to provide a coating of dense amorphous silica and alumina as in U.S. Pat. No. 3,437,502. For use in the present invention the amount of silica so employed may be up to 50% by weight based on $TiO_2$ and the amount of alumina may be up to 10% by weight based on $TiO_2$. In any case, such a hydrous metal oxide, although ostensibly increasing the particle diameters of the rutile as measured by the usual methods, does not affect appreciably the light scattering properties when dispersed in polymers because of the near equivalence of the refractive index of the coating to that of most polymers. Small differences in light scattering behaviors may be encountered because of the effects of the surface treatment on pigment dispersion.

The presence of particles of the anatase crystal modification of the specified diameters in the titanium dioxide is not considered inimical to its light scattering properties except when present in large percentages. Thus it is preferred that at least 70% of the titanium dioxide by weight be of the rutile crystal structure.

Useful concentrations of rutile titanium dioxide of the preferred particle sizes in solid polymeric compositions range from $10^{-4}$ to 10 volume percent based on total solids, depending on the geometry of the opalescent object to be fabricated. Opalescence, as defined herein, is conferred to the object if the concentration of the titanium dioxide is such that in at least one dimension a light ray will pass through the object and intercept $TiO_2$ particles in the amount of 0.07 to 1.5 grams per cross-sectional square meter, i.e. of a plane normal to the light ray. Below 0.07 $g/M^2$ the light reflected by scattering is relatively small and a weak haziness results. Above 1.5 $g/M^2$ of titanium dioxide the object is too opaque to transmit enough light for spectral contrast, although the opaque object may have the desirable appearance of fine china by reflected light. It is obvious that substantially complete and homogeneous dispersion of the titanium dioxide is desirable.

The preferred polymers for the compositions of this invention are also dependent to some degree on the geometry of the object to be fabricated. Where thick opalescent forms are desired it is of considerable importance that the polymer or copolymer be essentially colorless, clear and free from extraneous light scattering material such as bubbles (high transparency) when fabricated by the usual methods, since the concentration of titanium dioxide required for opalescence is necessarily low in this type of application. Examples of suitable polymers for thick sections include polystyrene, polyacrylates, polycarbonates and polyvinylchloride.

Where it is desired to produce opalescent films of a few mils or less in thickness, the structures on color or presence of bubbles are less critical since the concentrations of titanium dioxide will be relatively high. Most of the common film-forming polymers and copolymers such as alkyds, polyacrylates, nitrocellulose, polyurethanes, etc. are suitable for this aspect of the method of this invention, with only those compositions subject to appreciable discoloration or yellowing by elevated temperatures required for curing being of reduced utility. Use of dispersions of titanium dioxide in solutions of film-forming polymers dissolved in appropriate solvents, along with modifiers such as plasticizers and dispersants, to produce opalescent films is considered within the scope of this invention.

In addition to opalescent objects and forms the polymeric compositions of this invention when modified by the addition of colorants can be used to fabricate colored, translucent objects and forms with novel decorative effects. The preferred colorants are the so-called "transparent" pigments which are substantially organic in composition and which, by virtue of their low refractive indices and very small particle sizes, scatter very little of the incident light. Examples of these are the copper phthalocyanine and quinacridone pigments.

As with opalescent objects fabricated with the polymeric compositions of this invention the novel decorative effects produced with the color-containing compositions require a degree of translucency in the fabricated object such that substantial proportions of both reflected and transmitted light reach the eye from the illuminated object when viewed at various orientations with respect to the light source. Therefore, the limitations with respect to concentrations and thickness of titanium dioxide of the preferred particle sizes specified for opalescent compositions and objects also apply to the color containing compositions. Because of the number of available organic pigments of differing composition and the large number of grades of each pigment which differ in hue, masstone and dispersibility, it is impractical to specify the useful ranges of colorant concentrations.

Use of the compositions of this invention to produce opalescent objects and also colored translucent objects (containing transparent colored pigments) of novel appearance are described in the following examples. These examples are meant to be illustrative and not comprehensive since the scope of application of the compositions of this invention to decorative objects and forms will be limited only by the ingenuity and esthetic predilections of the designer.

EXAMPLE I

This example illustrates the effect of single crystal particles of rutile titanium dioxide on the opalescent effects obtained when the pigments are incorporated into polymer films. Although many visual effects of an esthetic nature are difficult to correlate with photometric measurements, it has been found that ratios of the diffuse transmission at a wavelength of 600 nanometers, which is in the orange region of the spectrum, to the diffuse transmission at 450 nanometers, which is in the blue region of the spectrum, correlates very well with visual judgement of the degree of opalescence in translucent films containing only white pigments. A high ratio of %T (600 nm)/%T (450 nm) denotes a high degree of opalescence and is consistent with the high blue reflectance observed in pure, natural opal.

Nine titanium dioxide pigments ranging in mean diameter by number from 0.25–0.03 micron were selected for evaluation. Eight of these were of predominantly the rutile crystal structure and seven of these were produced by the oxidation of titanium tetrachloride, the rutile of the smallest particle size being obtained by a hydrothermal process. The pigment in the series having the smallest sized particles (0.03 micron) was a commercial product, predominantly anatase, produced by high temperature hydrolysis of $TiCl_4$. All rutile samples were dry finished by low temperature calcination and fluid energy milled.

Each sample is ground for 16 hours in a acetone based nitrocellulose lacquer (the solvent of which comprises ethanol, ethylacetate and toluene) containing 14 weight percent solids, the solids comprising 8 parts of nitrocellulose vehicle and one part pigment. Films are formed on one mil cellophane film with a No. 24 wire wound rod to give a dry nitrocellulose film of 4% by volume and a thickness of 0.66 g/$M^2$ of titanium dioxide. The pigmented films are measured for percent transmission at wavelengths of 600 nanometers (orange) and 450 nm (blue) using a Cary Model 14 spectrophotometer wherein the collimated monochromatic light is incident at 90° and the predominantly diffusely transmitted light is measured with a photocell attached to an integrating sphere.

TABLE 1

| Pigment | % Rutile | Diam. (Microns) | % Transmission 600 nm | 450 nm | 600 nm/ 450 nm |
|---|---|---|---|---|---|
| R 11 | 100 | 0.25 | 10.2 | 7.0 | 1.45 |
| R 12 | 100 | 0.155 | 15.0 | 11.1 | 1.35 |
| R 13 | 88 | 0.12 | 10.5 | 3.0 | 3.5 |
| R 14 | 89 | 0.084 | 16 | 3.2 | 5.0 |
| R 15 | 97 | 0.079 | 19.2 | 3.5 | 5.5 |
| R 16 | 75 | 0.072 | 22 | 4.9 | 4.5 |
| R 17 | 73 | 0.056 | 26.6 | 6.6 | 4.1 |
| R 18 | 100 | 0.042 | 35 | 15 | 2.35 |
| R 19 | 16 | 0.03 | 32.2 | 17.2 | 1.9 |

Transmission values at 450 nm and 600 nm along with the ratio %T(600 nm)/%T(450 nm) are shown for the various pigments in Table 1. Visual examination of the films under illumination show that maximum opalescent effects are evident for the samples with the highest ratio of %T(600 nm)/%T(450 nm) which includes Samples R14, R15, R16, and R17. Sample R13 shows some visible opalescent effect but appears cloudy or hazy, perhaps due to an appreciable quantity of oversized particles. Sample R12 (0.155) shows no visible opalescent effect, presumably because of the non-selective scattering of these larger particles. Below 0.056 micron (Sample R17) the opalescent effects are reduced because of a rapid decrease in the blue reflectance with decreasing particle size. Then, too, there is more difficulty in achieving a homogeneous dispersion when the particle size becomes so small.

EXAMPLE II

This example illustrates the effect of pigment thickness on the character of the opalescence.

The nitrocellulose lacquer containing pigment R15 of Example I is diluted with more vehicle and a film formed on cellophane containing 2.5% by volume of titanium dioxide and a pigment thickness of 0.37 g/$M^2$. The transmitted light is distinctly yellower and the reflected light bluer than that from the film having 0.66 g/$M^2$ of the pigment. This greater blue reflectivity of the more dilute film is most apparent when comparing the two films by viewing at an oblique angle with the objects between the illumination and observer. The differentiation is not as apparent from spectrophotometric measurements.

Increasing the thickness of titanium dioxide of the preferred particle sizes shifts the character of the transmitted light to orange red and red, but the thicknesses of pigment required are so high — above 2 g/$M^2$ — that the films are too opaque to exhibit noticeable opalescent effects with normal illumination.

EXAMPLE III

Nitrocellulose lacquers of Example I containing R12 and R15 pigments are further diluted with vehicle to give a lacquer containing 1.1 volume percent pigment based on solids and films are deposited on aluminum foil to give titanium dioxide thicknesses of 0.14 g/$M^2$.

The aluminum foil coated with the lacquer containing the preferred R15 pigment exhibits variously a diffuse bluish or yellow appearance when viewed in reflected light at different angles. The foil coated with lacquer containing the oversized R12 pigment has a dull chalky white appearance at all viewing angles.

EXAMPLE IV

Polystyrene dispersions are prepared on a heated two-roll mill from general purpose polystyrene and the following quantities of pigments: (1) 0.025 pph of the R15 rutile pigment of Example I (2) 0.022 pph of R15 rutile pigment plus 0.003 pph phthalo blue BT-383-D pigment (Du Pont) (3) 0.036 pph of R15 rutile pigment plus 0.005 pph of quinacridone red pigment RT-761-D (Du Pont). These are molded into stepped chips having thicknesses of 69, 116, and 161 mils. Thicknesses of titanium dioxide in the chips range from 0.40 to 1.5 g/$M^2$ at white pigment volume concentrations of 0.005–0.009%.

The chip containing only R15 titanium dioxide (No. 1) duplicates the appearance of pure natural opal having a distinct bluish white reflectance and a yellow-orange transmitted light. The chip (No. 2) containing added phthalo blue pigment is a bright, luminous blue by reflected light but the transmitted light is distinctly green. The chip containing the added quinacridone red pigment is pink by reflected light and orange by transmitted light.

Polystyrene chips prepared with equivalent concentrations of commercial rutile and anatase pigments of the smallest available size show only a dull chalky appearance in the uncolored chip, and no color differentiation between the reflected and transmitted light in these color-containing chips.

EXAMPLE V

Ten pounds of acrylic resin molding beads are shaken with 0.68 grams of the R15 pigment of Example I and 0.0915 g. phthalo-blue BT-38-D (Du Pont) and charged to a large extruder to form diamond faceted tumblers with facet thicknesses of from 155 to 270 mils. Thicknesses of titanium dioxide range from 0.72 to 1.25 g/M² at a pigment volume concentration of 4.5 × 10⁻³%.

the tumblers are brilliant translucent blue in appearance with distinct green highlights due to internal reflection of transmitted light from the interior surfaces of the tumblers.

EXAMPLE VI

A soft vinyl film is prepared by dispersing 0.118 pph by weight of the rutile pigment R16 of Example I and 0.012 g of quinacridone red pigment RT-761-D in a plasticized polyvinyl chloride resin on a heated two roll mill. The thickness of the titanium dioxide in the film is 0.12 g/M² at a volume concentration of 0.03%.

The film when draped and viewed against an absorbing background exhibits both bright pink and violet colors depending on the angle of viewing. When viewed by transmitted light an orange color is apparent.

EXAMPLE VII

A nitrocellulose lacquer is prepared containing 4.6% by weight of R15 rutile pigment and 1.08% by weight of Carbolac No. 1 black pigment (Cabot Corp.) based on total solids. The lacquer is applied to aluminum foil as a film to give a thickness of 0.25 g/M² of titanium dioxide.

A pleasing yellow metallic appearance is noted with direct incandescent illumination while in diffuse illumination the color is bluish gun-metal gray. Substitution of a rutile titanium dioxide having a particular size of 0.155 micron (R12) for the preferred rutile results in a chalky, non-metallic appearance.

EXAMPLE VIII

Nylon fibers are spun from polymer containing 0.2% by weight of R15 rutile pigment. A satin cloth woven from the fiber exhibits a lustrous blue-white sheen, more opaque and whiter than the unpigmented control. Satin cloth prepared from the same nylon fiber containing 0.2% by weight of a commercial pigment is dull and yellowish in appearance.

What is claimed is:

1. A solid polymeric composition which is useful for fabricating decorative objects and forms having the apparance of pure, natural opal, said composition consisting of a substantially clear, colorless organic polymeric solid matrix free of light scattering material and $10^{-4}$ to 10 volume percent of titanium dioxide substantially homogeneously dispersed therein, and titanium dioxide consisting of particles being at least 70 percent by weight of the rutile crystal structure and having a mean equivalent volume diameter by number of between 0.05 and 0.10 micron and essentially free of particles having a dimension above 0.15 micron.

2. A composition for fabricating a decorative object which comprises the composition of claim 1 plus a colorant dispersed therein, said colorant permitting a degree of translucency such that substantial portions of both reflected and transmitted light reach the eye from the illuminated decorative object.

3. A composition of claim 2 wherein the colorant is a transparent phthalocyanine blue pigment.

4. A composition of claim 2 wherein the colorant is a transparent quinacridone red pigment.

5. A composition of claim 2 wherein the colorant is carbon black.

* * * * *